US011265059B2

(12) United States Patent
Yang et al.

(10) Patent No.: US 11,265,059 B2
(45) Date of Patent: Mar. 1, 2022

(54) DATA TRANSMISSION METHOD, USER EQUIPMENT AND NETWORK DEVICE

(71) Applicant: Guangdong OPPO Mobile Telecommunications Corp., Ltd., Guangdong (CN)

(72) Inventors: Ning Yang, Guangdong (CN); Hua Xu, Ottawa (CA); Hai Tang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/345,430

(22) PCT Filed: Nov. 3, 2016

(86) PCT No.: PCT/CN2016/104475
§ 371 (c)(1),
(2) Date: Apr. 26, 2019

(87) PCT Pub. No.: WO2018/081990
PCT Pub. Date: May 11, 2018

(65) Prior Publication Data
US 2019/0253122 A1  Aug. 15, 2019

(51) Int. Cl.
*H04B 7/06* (2006.01)
*H04W 72/04* (2009.01)
(Continued)

(52) U.S. Cl.
CPC ............ *H04B 7/0639* (2013.01); *H04B 7/04* (2013.01); *H04B 7/06* (2013.01); *H04B 7/0697* (2013.01);
(Continued)

(58) Field of Classification Search
CPC .................................................. H04B 7/0639
(Continued)

(56) References Cited

U.S. PATENT DOCUMENTS

2011/0176632 A1* 7/2011 Jeong ................... H04B 7/0413
375/267
2012/0243505 A1* 9/2012 Lin ........................ H04L 5/0051
370/331
(Continued)

FOREIGN PATENT DOCUMENTS

CN 103270714 A 8/2013
CN 104734763 A 6/2015
(Continued)

OTHER PUBLICATIONS

Qualcomm Incorporated, "Phase 1 Waveform Proposal: CP-OFDM Plus DFT-S-OFDM", 3GPP TSG-RAN WG1 #86, RI-1610111, Oct. 1, 2016 (Oct. 1, 2016), sections 2.3 and 2.5.
(Continued)

*Primary Examiner* — Lihong Yu
(74) *Attorney, Agent, or Firm* — Young Basile Hanlon & MacFarlane, P.C.

(57) ABSTRACT

Methods for data transmission, user equipment and a network device are provided. The method includes: User Equipment (UE) transmits data to a network device by using a first uplink transmission waveform on a first beam; the UE receives a first indication message transmitted by the network device, the first indication message is used for indicating an uplink transmission waveform corresponding to at least one beam; and the UE transmits data to the network device by using a second uplink transmission waveform on a second beam of the at least one beam, the second uplink
(Continued)

transmission waveform is an uplink transmission waveform corresponding to the second beam indicated in the first indication message.

16 Claims, 3 Drawing Sheets

(51) Int. Cl.
  *H04L 5/00* (2006.01)
  *H04L 27/00* (2006.01)
  *H04B 7/04* (2017.01)

(52) U.S. Cl.
  CPC ............ *H04L 5/0035* (2013.01); *H04L 27/00* (2013.01); *H04W 72/0406* (2013.01); *H04L 5/0007* (2013.01)

(58) Field of Classification Search
  USPC .......................................................... 375/262
  See application file for complete search history.

(56) References Cited

U.S. PATENT DOCUMENTS

| | | | |
|---|---|---|---|
| 2013/0051485 A1* | 2/2013 | Taori ................... | H04L 27/2626 375/260 |
| 2015/0063201 A1* | 3/2015 | Kim .................... | H04B 7/18513 370/316 |
| 2015/0092528 A1 | 4/2015 | Luo et al. | |
| 2016/0087708 A1 | 3/2016 | Kang et al. | |
| 2016/0227538 A1* | 8/2016 | Seo ....................... | H04B 7/2615 |
| 2016/0359536 A1* | 12/2016 | Guo ........................ | H04B 7/063 |
| 2019/0173712 A1* | 6/2019 | Yamamoto ........ | H04W 72/0453 |

FOREIGN PATENT DOCUMENTS

| | | |
|---|---|---|
| CN | 107306452 A | 10/2017 |
| EP | 2353244 A2 | 8/2011 |
| JP | 2012502600 A | 1/2012 |
| KR | 101328790 B1 | 11/2013 |
| WO | 2010030941 A2 | 3/2010 |
| WO | 2015090058 A1 | 6/2015 |
| WO | 2016025111 A1 | 2/2016 |
| WO | 2016095637 A1 | 6/2016 |

OTHER PUBLICATIONS

Idaho National Laboratory, "Optimized PAPR/CM SC-CPS Waveform and Further Results", 3GPP TGS-RAN WG1 #86bis, RI-1608709, Oct. 3, 2016 (Oct. 3, 2016), pp. 1-10.
Extended European search report issued in corresponding European application No. 16920858.4 dated Sep. 30, 2019.
Canada Office Action for CA application No. 3041935 dated May 22, 2020.
Brazil Office Action with English Translation of BR Application BR112019008736-2 dated Aug. 24, 2020.
China First Office Action and English Translation of CN Application 201680090604.7 dated Aug. 10, 2020.
3GPP TSG RAN WG1 Meeting #84bis; Busan, South Korea, Apr. 11-15, 2016; R1-162384.
3GPP TSG-RAN WG1 #86; Goteborg, Sweden, Aug. 22-26, 2016; R1-166226.
3GPP TSG RAN WG1 #86; Gothenburg, Sweden, Aug. 22-26, 2016; R1-168051.
First India Examination Report and Translation for Application No. 201917018734 dated Oct. 20, 2020.
First Japanese Office Action with Translation for Application 2019-523031 dated Nov. 5, 2020.
European Examination Report for Application 16920858.4 dated Apr. 12, 2020.
3GPP TSG RAN WG1 Meetubg #86bis; R1-1610877; Lisbon, Portugal, Oct. 10-14, 2016; pp. 1-6; Title: Chairman's Notes of Agenda Item 8.1.1 Waveform and multiple acess schemes for new radio interface.
Canada Second Office Action for CA Application 3041935 dated Apr. 21, 2021.
Indonesia First Office Action with English Translation for IN Application P00201904525 dated Apr. 26, 2021.
Japan Second Office Action with English Translation for JP Application 2019-523031 dated Mar. 16, 2021.
Taiwan First Office Action with English Translation for TW Application 11020232610 dated Mar. 15, 2021.
Japanese Decision of Refusal with English Translation for JP Application 2019523031 dated Sep. 3, 2021. (7 pages).
Australian Examination Report for AU Application 2016428423 dated Aug. 17, 2021. (5 pages).
Taiwan Notice of Rejection with English Translation for TW Application 106137480 dated Sep. 29, 2021. (6 pages).
Canadian Examination Report for CA Application 3041935 dated Dec. 7, 2021. (4 pages).

* cited by examiner

DATA TRANSMISSION METHOD, USER EQUIPMENT AND NETWORK DEVICE

CROSS-REFERENCE TO RELATED APPLICATION(S)

This application is a 371 application of International Application No. PCT/CN2016/104475, filed on Nov. 3, 2016, the entire disclosure of which is hereby incorporated by reference.

TECHNICAL FIELD

Implementations of the present disclosure relates to the field of communication and, more particularly, to methods for data transmission, user equipment and a network device.

BACKGROUND

With continuously rising of application frequency bands in communication technology, a challenge to network coverage is increasing. Beamforming is a signal pre-processing technology based on an antenna array. Through beamforming, directional beams are generated by adjusting a weighting coefficient of each element in the antenna array, so that an apparent array gain can be obtained. At present, beamforming technology is a key technology to improve network coverage.

At higher frequency bands, a beam/beamformed signal between a base station and User Equipment (UE) is easily blocked by factors such as obstacles or UE movement, which results in a block of a communication link. To solve the problem, a solution for measurement or transmission based on multiple beams/beamformed signals is provided. When the current working beam/beamformed signal is blocked, UE can communicate with the base station on a fallback beam/beamformed signal.

However, different beams/beamformed signals may come from different Transmit and Receive Points (TRPs). Due to reasons such as distances between UE and different TRPs may be different, and signal deteriorations on transmission paths corresponding to different beams/beamformed signals are different, signal energy losses of the UE on the transmission paths corresponding to the different beams/beamformed signals may also be different. Therefore, if UE transmits data on different beams, different uplink transmission waveforms may need to be used. For example, a UE needs to use an uplink transmission waveform determined according to Discrete Fourier Transform-Spread-Orthogonal Frequency Division Multiplexing (DFT-S-OFDM) technology on one beam, and the UE needs to use an uplink transmission waveform determined according to Cyclic Prefix-Orthogonal Frequency Division Multiplexing (CP-OFDM) technology on another beam. In the related art, no solution for the above-mentioned situation has been provided.

SUMMARY

Implementations of the present disclosure provide methods for data transmission, user equipment and a network device.

In a first aspect, a method for data transmission is provided. The method includes: transmitting, by User Equipment (UE), data to a network device by using a first uplink transmission waveform on a first beam; receiving, by the UE, a first indication message transmitted by the network device, wherein the first indication message is used for indicating an uplink transmission waveform corresponding to at least one beam; and transmitting, by the UE, data to the network device by using a second uplink transmission waveform on a second beam of the at least one beam, wherein the second uplink transmission waveform is an uplink transmission waveform corresponding to the second beam indicated in the first indication message.

In combination with the first aspect, in some implementation modes of the first aspect, the at least one beam includes two or more than two beams, and uplink transmission waveforms corresponding to different beams of the at least one beam are not exactly same.

In combination with the first aspect, in some implementation modes of the first aspect, the uplink transmission waveform corresponding to the second beam is determined by the network device according to channel quality information of a transmission channel corresponding to the second beam or location information of the UE in a cell.

Optionally, in some implementation modes, the at least one beam includes two or more than two beams, and uplink transmission waveforms corresponding to different beams of the at least one beam are the same.

In combination with the first aspect, in some implementation modes of the first aspect, the at least one beam does not include the first beam, and transmitting, by the UE, data to the network device by using the second uplink transmission waveform on the second beam of the at least one beam includes: transmitting, by the UE, data to the network device by using the second uplink transmission waveform on the second beam when the first beam is blocked.

In combination with the first aspect, in some implementation modes of the first aspect, the first indication message is further used for indicating that the at least one beam is a fallback beam of the UE.

In combination with the first aspect, in some implementation modes of the first aspect, the method further includes: receiving, by the UE, a second indication message transmitted by the network device, wherein the second indication message is used for indicating an uplink transmission waveform corresponding to the at least one beam, the uplink transmission waveform corresponding to the at least one beam indicated by the second indication message is different from the uplink transmission waveform corresponding to the at least one beam indicated by the first indication message; and transmitting, by the UE, data to the network device by using a third uplink transmission waveform on a third beam of the at least one beam, wherein the third uplink transmission waveform is an uplink transmission waveform corresponding to the third beam indicated in the second indication message.

Optionally, in some implementation modes, the second indication message is transmitted by the network device when the location of the UE changes.

In combination with the first aspect, in some implementation modes of the first aspect, the first indication message is high level signaling or Downlink Control Information (DCI).

In combination with the first aspect, in some implementation modes of the first aspect, the uplink transmission waveform includes a waveform modulated by using Discrete Fourier Transform-Spread-Orthogonal Frequency Division Multiplexing (DFT-S-OFDM) technology or a waveform modulated by using Cyclic Prefix-Orthogonal Frequency Division Multiplexing (CP-OFDM) technology.

In a second aspect, a method for data transmission is provided, the method includes: receiving, by a network device, data transmitted by User Equipment (UE) by using a first uplink transmission waveform on a first beam; determining, by the network device, an uplink transmission waveform corresponding to at least one beam; and transmitting, by the network device, a first indication message to the UE, wherein the first indication message is used for indicating the uplink transmission waveform corresponding to the at least one beam.

In combination with the second aspect, in some implementation modes of the second aspect, the at least one beam includes two or more than two beams, and uplink transmission waveforms corresponding to different beams of the at least one beam are not exactly same.

Optionally, in some implementation modes, the at least one beam includes two or more than two beams, and uplink transmission waveforms corresponding to different beams of the at least one beam are the same.

In combination with the second aspect, in some implementation modes of the second aspect, determining, by the network device, the uplink transmission waveform corresponding to the at least one beam includes: determining, by the network device, the uplink transmission waveform of each beam of the at least one beam according to at least one of the following information: channel quality information of a transmission channel corresponding to the each beam, and location information of the UE in a cell.

In combination with the second aspect, in some implementation modes of the second aspect, the at least one beam does not include the first beam, and the first indication message is further used for instructing the UE to use the at least one beam as a fallback beam.

Optionally, in some implementation modes, the first indication message may also be used for indicating that the at least one beam is used as an active beam of the UE. Specifically, the active beam refers to a beam used by the UE for communicating with the network device at a current time point.

In combination with the second aspect, in some implementation modes of the second aspect, the method further includes: re-determining, by the network device, an uplink transmission waveform corresponding to the at least one beam, wherein the re-determined uplink transmission waveform corresponding to the at least one beam is different from an uplink transmission waveform corresponding to the at least one beam determined at a previous time; and transmitting, by the network device, a second indication message to the UE, wherein the second indication message is used for indicating the re-determined uplink transmission waveform corresponding to the at least one beam.

Optionally, as an implementation mode, re-determining, by the network device, the uplink transmission waveform corresponding to the at least one beam includes: when the location of the UE changes, the network device re-determines the uplink transmission waveform corresponding to the at least one beam. Optionally, the network device may re-determine the unlink transmission waveform of each beam of the at least one beam according to at least one of the following information: a distance between a Transmit and Receive Point (TRP) corresponding to each beam and the UE, signal deterioration of a transmission channel corresponding to each beam, and the location of the UE in a cell.

In combination with the second aspect, in some implementation modes of the second aspect, the first indication message is high level signaling or Downlink Control Information (DCI).

Optionally, in some implementation modes, the first indication message is high level signaling and the second indication message is DCI.

In combination with the second aspect, in some implementation modes of the second aspect, the uplink transmission waveform includes a waveform modulated by using a DFT-S-OFDM technology or a waveform modulated by using a CP-OFDM technology.

Optionally, in some implementation modes, the DFT-S-OFDM technology may be Single-carrier Frequency-Division Multiple Access (SC-FDMA) technology.

Optionally, in some implementation modes described above, the high level signaling is, for example, Radio Resource Control (RRC) signaling.

Optionally, in various implementation modes described above, the beam may also be called as a Beamformed Signal.

In a third aspect, user equipment is provided. The user equipment is used for executing the method in the first aspect or in any possible implementation mode of the first aspect. Specifically, the user equipment may include modules for executing the method in the first aspect or in any possible implementation mode of the first aspect.

In a fourth aspect, a network device is provided. The network device is used for executing the method in the second aspect or in any possible implementation mode of the second aspect. Specifically, the network device may include modules for executing the method in the second aspect or in any possible implementation mode of the second aspect.

In a fifth aspect, user equipment is provided. The user equipment includes a memory and a processor, the memory is used for storing instructions, the processor is used for executing the instructions stored in the memory, and the execution of the instructions stored in the memory enables the processor to execute the method in the first aspect or in any possible implementation mode of the first aspect.

In a sixth aspect, a network device is provided. The network device includes a memory and a processor, the memory is used for storing instructions, the processor is used for executing the instructions stored in the memory, and the execution of the instructions stored in the memory enables the processor to execute the method in the second aspect or in any possible implementation mode of the second aspect.

In a seventh aspect, a computer-readable medium is provided, which is used for storing a computer program including instructions used for executing the method in the first aspect or in any possible implementation mode of the first aspect.

In an eighth aspect, a computer-readable medium is provided, which is used for storing a computer program including instructions used for executing the method in the second aspect or in any possible implementation mode of the second aspect.

BRIEF DESCRIPTION OF DRAWINGS

In order to describe technical solutions of implementations of the present disclosure more clearly, the drawings to be used in the description of the implementations or the related art will be simply introduced below. Apparently, the drawings described below are only some implementations of the present disclosure, and one skilled in the art can obtain other drawings according to these drawings without paying an inventive effort.

DETAILED DESCRIPTION

Technical solutions in implementations of the present disclosure will be described below clearly and completely with reference to the drawings in the implementations of the present disclosure. Apparently, the implementations described are part, but not all, of implementations of the present disclosure. All other implementations obtained by one skilled in the art based on the implementations of the present disclosure without paying an inventive effort shall fall into the protection scope of the present disclosure.

The technical solutions of the implementations of the present disclosure can be applied to various communication systems, such as a Global System of Mobile Communication (GSM), Code Division Multiple Access (CDMA) system, Wideband Code Division Multiple Access (WCDMA) system, General Packet Radio Service (GPRS) system, Long Term Evolution (LTE) system, LTE Frequency Division Duplex (FDD) system, LTE Time Division Duplex (TDD) system, Universal Mobile Telecommunication System (UMTS), Worldwide Interoperability for Microwave Access (WiMAX) communication system, future 5G system, or New Radio Technology (NR) system.

User Equipment (UE) is involved in the technical solutions of the implementations of the present disclosure. User Equipment can also be called as a terminal, access terminal, user unit, user station, mobile radio station, mobile station, remote station, remote terminal, mobile device, user terminal, terminal equipment, wireless communication equipment, user agent, or user device. For example, the user equipment may be a mobile phone (or "cellular" phone), cordless phone, Session Initiation Protocol (SIP) phone, Wireless Local Loop (WLL) station, Personal Digital Assistant (PDA), handheld device with a wireless communication function, computing device or other processing device connected to a wireless modem, vehicle-mounted device, wearable device, terminal in future 5G network or network after 5G, etc., which is not restricted in the implementations of the present disclosure. User equipment can communicate with one or more core networks via a Radio Access Network (RAN), or can access a distributed point-to-point (Ad-Hoc) mode network and a user-deployed sub-network by means of self-organization or license-exempt, and user equipment can access networks in other ways, which is not restricted in the implementations of the present disclosure.

A network device is also involved in the technical solutions of the implementations of the present disclosure. A network device may be a network-side device used for communicating with user equipment. Specifically, the network device may be a network device providing wireless access and communication services for mobile or fixed terminals in a cell. For example, the network device may be a Base Transceiver Station (BTS) in a GSM system or CDMA system, a NodeB (NB) in a WCDMA system, or an Evolutional Node B (eNB or eNodeB) in an LTE system. The network device may also be a relay station, an access point, vehicle-mounted equipment or a wearable device. The network device may also be a network-side device in a future 5G network or a network after 5G, a network-side device in a future evolved PLNN network, or a network-side device in an NR network.

Figure 1:
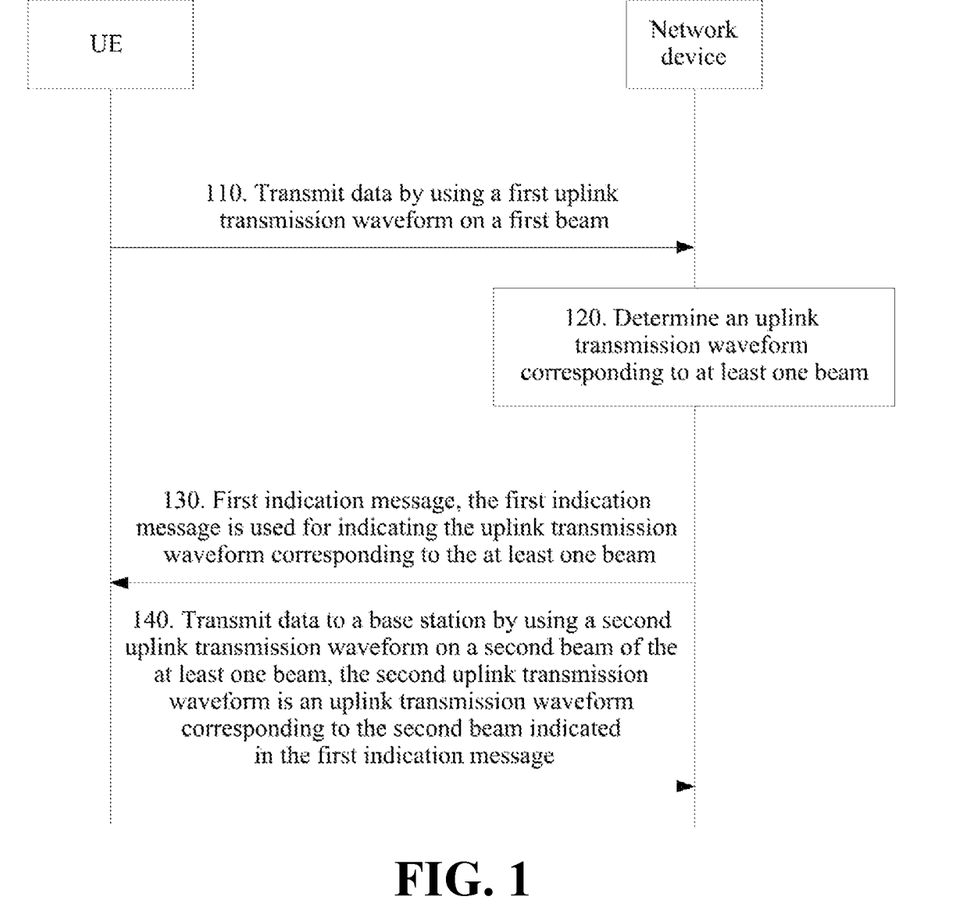
FIG. 1 illustrates a schematic flowchart of a method for data transmission provided by an implementation of the present disclosure.

FIG. 1 illustrates a schematic flowchart of a method 100 for data transmission provided by an implementation of the present disclosure. The method 100 includes the following acts 110 to 140.

In 110, User Equipment (UE) transmits data to a network device by using a first uplink transmission waveform on a first beam.

The first beam may also be called as an active beam of the UE. The active beam refers to a beam adopted by the UE for communicating with the network device at a current time point.

The first uplink transmission beam may be a default/fallback uplink transmission waveform configured by the UE. For example, the first uplink transmission beam is a waveform determined by using DFT-S-OFDM technology or a waveform determined by using CP-OFDM technology. When the related configuration information of the system is not received, the UE uses the default/fallback uplink transmission waveform for uplink transmission.

Optionally, the default/fallback uplink transmission waveform may be set by the UE itself, or the default/fallback uplink transmission waveform may be specified by a protocol, or the default/fallback uplink transmission waveform may be set by the UE according to broadcast information or system information of a network-side device (such as the network device).

For example, the DFT-S-OFDM technology may be Single-carrier Frequency-Division Multiple Access (SC-FDMA) technology.

In 120, the network device determines an uplink transmission waveform corresponding to at least one beam.

Specifically, in this implementation, the at least one beam is a beam used for communicating with the network device by the UE.

Optionally, the at least one beam may be one beam, or multiple beams, or one beam group, or multiple beam groups. A beam group refers to a combined beam of multiple beams. Or, the at least one beam may be one formed-signal corresponding to one beam, or multiple formed-signals corresponding to multiple beams, or one formed-signal group corresponding to one beam group, or multiple formed-signal groups corresponding to multiple beam groups. It should be understood that the aforementioned formed-signal refers to a formed-signal formed by a corresponding beam, and the formed-signal group refers to a formed-signal group formed by a corresponding beam group.

Optionally, in this implementation, determining, by the network device, the uplink transmission waveform corresponding to the at least one beam includes: the network device determines the uplink transmission waveform of each beam of the at least one beam according to at least one of the following information: channel quality information of a transmission channel corresponding to the each beam, and location information of the UE in a cell.

Specifically, the channel quality information of the transmission channel corresponding to a beam is, for example, signal deterioration information of the transmission channel corresponding to the beam.

Specifically, taking a beam A of the at least one beam as an example, the network device obtains the channel quality information of the transmission channel corresponding to the beam A or the location information of the UE in the cell according to measurement information reported by the UE. Optionally, the network device obtains the channel quality information of the transmission channel corresponding to the beam A or the location information of the UE in the cell also according to experience information.

For example, assuming that the at least one beam includes a beam A and a beam B, and that the distance between a TRP corresponding to the beam A and the UE is much less than that between the TRP corresponding to the beam B and the UE, the uplink transmission waveform corresponding to the beam A is different from the uplink transmission waveform corresponding to the beam B. For example, the uplink transmission waveform corresponding to the beam A is a waveform determined by using DFT-S-OFDM technology, and the uplink transmission waveform corresponding to the beam B is a waveform determined by using CP-OFDM technology.

For another example, assuming that the at least one beam includes a beam C and a beam D, and the signal deterioration of a transmission channel corresponding to the beam C is more serious than that of a transmission channel corresponding to the beam B, the uplink transmission waveform corresponding to the beam C is different from the uplink transmission waveform corresponding to the beam D, for example, the uplink transmission waveform corresponding to the beam C is a waveform determined by using DFT-S-OFDM technology, and the uplink transmission waveform corresponding to the beam D is a waveform determined by using CP-OFDM technology.

In 130, the network device transmits a first indication message to the UE, wherein the first indication message is used for indicating the uplink transmission waveform corresponding to the at least one beam.

Optionally, the first indication message may be High Level Signaling, and specifically, for example, the first indication message may be Radio Resource Control (RRC) signaling.

Optionally, the first indication message may be Downlink Control Information (DCI).

In 140, the UE transmits data to the network device by using a second uplink transmission waveform on a second beam of the at least one beam, wherein the second uplink transmission waveform is an uplink transmission waveform corresponding to the second beam indicated in the first indication message.

Therefore, in an implementation of the present disclosure, the indication message is transmitted by the network device to the UE to inform the UE to transmit data by using corresponding uplink transmission waveforms on different beams, such that the UE can transmit data on different beams through suitable uplink transmission waveforms, thus better uplink coverage and uplink transmission quality can be obtained, and the performance of uplink transmission is improved.

It should be understood that the beams in implementations of the present disclosure may also be referred to as beamformed signals, which are described below by taking beams as an example.

Optionally, as an implementation mode, the at least one beam may include the first beam.

For example, when the network device detects that the channel quality of the transmission channel corresponding to the first beam has changed and the uplink transmission waveform on the first beam needs to be changed, the network device may send an indication message to inform the UE to change the uplink transmission waveform on the first beam. After receiving the indication message from the network device, the UE continues to communicate with the network device on the first beam, but the uplink transmission waveform is changed.

Optionally, as an implementation mode, the at least one beam may not include the first beam, and the at least one beam may be used as a fallback beam or an active beam of the UE.

Optionally, in some implementations, the at least one beam may not include the first beam, the first indication message is used for indicating that the at least one beam is used as a fallback beam of the UE, and the act 140, i.e., transmitting, by the UE, data to the network device by using the second uplink transmission waveform on the second beam of the at least one beam, includes: the UE transmits data to the network device by using the second uplink transmission waveform on the second beam when the first beam is blocked.

For example, the UE is communicating with the network device on a beam (denoted as active beam). At the same time, the network device configures the UE to measure other M beams. The UE feeds back channel quality of N beams (N<=M), and the network device determines according to the feedback from the UE and other factors in combination, or network device determines according to measurements of some uplink signals/channels of the UE and other factors in combination, or network device determines according to the feedback from the UE, measurements, by the network device, of some uplink signals/channels of the UE and other factors in combination, to use L beams (L<=N) as fallback beams, and informs the UE of a uplink transmission waveform which is used when transmission is performed on a beam (one beam of L beams). At a subsequent moment, if the original beam is blocked for some reason, the UE initiates random access on a fallback beam according to some criteria at this moment, and the waveform informed to the UE is used as the uplink transmission waveform of the UE.

Optionally, in some implementations, the at least one beam may not include the first beam, the first indication message is used for indicating that the at least one beam is used as an active beam of the UE, and the act 140, i.e., transmitting, by the UE, data to the network device by using the second uplink transmission waveform on the second beam of the at least one beam includes: the UE simultaneously transmits data to the network device by using the first uplink transmission waveform on the first beam, and transmits data to the network device by using the second uplink transmission waveform on the second beam of the at least one beam.

For example, the UE is communicating with the network device on a beam (denoted as active beam 1) (the uplink transmission beam of CP-OFDM is used). At the same time, the network device configures the UE to measure other M beams, UE feeds back channel quality of N beams (N<=M), and network device determines according to the feedback from the UE and other factors in combination, to use L beams (L<=N) also as active beams and allows the UE to transmit on these beams at the same time. Assuming L=1, the corresponding beam is denoted as active beam 2. Because the UE needs to perform uplink transmission on two beams at the same time, energy needs to be allocated to different beams. Assuming that energy of the UE on the previous active beam 1 is sufficient, the uplink transmission beam of CP-OFDM is still used, and the residual power of the UE is limited, the network device determines that it is more suitable for the UE to use the uplink transmission waveform of DFT-S-OFDM on the second active beam 2, and when the network device configures the active beam 2, the network device notifies the UE to use the uplink transmission waveform of DFT-S-OFDM as the uplink transmission waveform.

For ease of understanding and description, description is made by taking a UE as an example in the implementation described with reference to FIG. 1. In practical application, the network device can communicate with a user equipment group (a set including multiple UEs), or communicate with multiple UEs or multiple UE groups. Therefore, when the network device configures uplink transmission waveforms corresponding to beams, an uplink transmission waveform of at least one beam corresponding to each UE or each user equipment group may be independently configured for each UE or each user equipment group. Correspondingly, the network device sends an indication message used for indicating the uplink transmission waveform corresponding to the at least one beam (e.g. the first indication message illustrated in FIG. 1), or it may be independently configured or indicated for each UE or each user equipment group, i.e. UE-specific.

Optionally, the uplink transmission waveform involved in an implementation of the present disclosure includes a waveform determined by using DFT-S-OFDM technology or a waveform determined by using CP-OFDM technology.

Optionally, in some implementations, the at least one beam includes two or more than two beams, and the act 120, i.e., determining, by the network device, the uplink transmission waveform corresponding to the at least one beam includes: the network device configures an uplink transmission waveform for the at least one beam, which can support one or more or all of the following options.

Option 1: configuring a unified uplink transmission waveform for uplink channels corresponding to different beams.

For example, the uplink channels corresponding to different beams include Physical Uplink Shared Channels (PUSCH) and Physical Uplink Control Channels (PUCCH). The following description is made by taking that the uplink channels corresponding to different beams include PUSCH and PUCCH as an example.

Optionally, in this implementation, the same uplink transmission waveform of DFT-S-OFDM is configured for PUSCH and PUCCH.

Optionally, in this implementation, the same uplink transmission waveform of CP-OFDM is configured for PUSCH and PUCCH.

Option 2: configuring respective uplink transmission waveforms for uplink channels (such as PUSCH and PUCCH) corresponding to different beams.

Optionally, in this implementation, an uplink transmission waveform of CP-OFDM is configured for PUSCH and an uplink transmission waveform of CP-OFDM is configured for PUCCH.

Optionally, in this implementation, an uplink transmission waveform of DFT-S-OFDM is configured for PUSCH, and an uplink transmission waveform of DFT-S-OFDM is configured for PUCCH.

Optionally, in this implementation, an uplink transmission waveform of CP-OFDM is configured for PUSCH, and an uplink transmission waveform of DFT-S-OFDM is configured for PUCCH.

Optionally, in this implementation, an uplink transmission waveform of DFT-S-OFDM is configured for PUSCH, and an uplink transmission waveform of CP-OFDM is configured for PUCCH.

Option 3: independently configuring respective uplink transmission waveforms for uplink channels corresponding to different beams or uplink channels of different channel formats. For example, the uplink channels corresponding to different beams include PUSCH and PUCCH, where PUCCH can be divided into different channels according to different channel formats.

Specifically, PUCCH is divided into two groups according to its channel formats, referred to as PUCCH_Group_1 and PUCCH_GROUP_2. Thus, the network device can respectively and independently configure uplink transmission waveforms for PUCCH_Group_1 and PUSCH, and indicate that DFT-S-OFDM or CP-OFDM is used as a corresponding uplink transmission waveform, wherein the uplink transmission waveform configured for PUCCH_Group_2 is kept consistent with the uplink transmission waveform configured for PUSCH.

Specifically, PUCCH is divided into N groups according to its channel formats, respectively referred to as PUCCH_Group_1, . . . PUCCH_GROUP_N. Thus, the network device can respectively and independently configure uplink transmission waveforms for PUCCH_Group_1, . . . PUCCH_GROUP_N and PUSCH, and indicate that DFT-S-OFDM or CP-OFDM is used for corresponding uplink transmission waveforms.

Optionally, in some implementations, when the uplink transmission waveform of a channel of a channel format or some channel formats is configured as an uplink transmission waveform (such as SC-FDMA), uplink transmission waveforms of other channels have to be configured as the uplink transmission waveform.

Specifically, for example, when a PUSCH is configured to use DFT-S-OFDM as an uplink transmission waveform, the PUCCH or PUCCH group (corresponding to the PUCCH_Group_i (i is 1, . . . N) mentioned above) has to be configured to use DFT-S-OFDM as the uplink transmission waveform.

It should be understood that, when PUSCH is configured to use CP-OFDM as the uplink transmission waveform, the PUCCH or PUCCH group can be configured to select DFT-S-OFDM or CP-OFDM as the uplink transmission waveform.

Optionally, in some implementations, the method 100 further includes: the network device re-determines an uplink transmission waveform corresponding to the at least one beam, the re-determined uplink transmission waveform corresponding to the at least one beam is different from an uplink transmission waveform corresponding to the at least one beam determined at a previous time (in act 120); the network device transmits a second indication message to the UE, the second indication message is used for indicating the re-determined uplink transmission waveform corresponding to the at least one beam; and the UE transmits data to the network device by using a third uplink transmission waveform on a third beam of the at least one beam, the third uplink transmission waveform is an uplink transmission waveform corresponding to the third beam indicated in the second indication message.

Optionally, in this implementation, re-determining, by the network device, the uplink transmission waveform corresponding to the at least one beam includes: when the location of the UE changes, the network device re-determines an uplink transmission waveform corresponding to the at least one beam. Optionally, the network device may re-determine the uplink transmission waveform of each beam of the at least one beam according to at least one of the following information: a distance between a TRP corresponding to each beam and the UE, signal deterioration of a transmission channel corresponding to each beam, and a location of the UE in a cell covered by the network device.

Specifically, the second indication message may be DCI. The second indication message may be configured independently for different UEs or different user equipment groups, and be notified independently.

In this implementation, the configuration information of the uplink transmission waveform of the at least one beam indicated by the first indication message is reset by the configuration information indicated by the second indication message (such as DCI).

For example, the network device initially uses high level signaling to indicate that a beam/beam group corresponding to a UE or a user equipment group uses an uplink transmission waveform, and recently uses DCI signaling to indicate that the beam/beam group corresponding to the UE or the user equipment group uses another uplink transmission waveform, and thus the instructed UE or user equipment group uses the uplink transmission waveform instructed recently by DCI.

Optionally, in this implementation, the uplink transmission waveform reconfigured by the network device for the at least one beam can support any one, more, or all of Option 1 to Option 3.

Optionally, in some implementations, the first indication message may also be Downlink Control Information (DCI).

To sum up, in the technical solutions provided by the implementations of the present disclosure, the indication message is transmitted by the network device to the UE to inform the UE to transmit data by using corresponding uplink transmission waveforms on different beams, such that the UE can transmit data on different beams through suitable uplink transmission waveforms, thus better uplink coverage and uplink transmission quality can be obtained, and the performance of uplink transmission is improved.

The method for data transmission provided by the implementation of the present disclosure is described above with reference to FIG. 1, and the user equipment and network device provided by the implementations of the present disclosure will be described below with reference to FIG. 2-FIG. 5.

Figure 2:
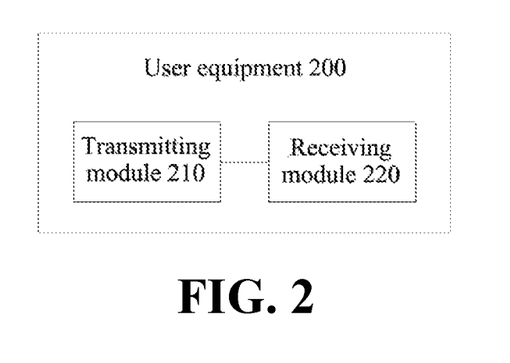
FIG. 2 illustrates a schematic diagram of user equipment provided by an implementation of the present disclosure.

FIG. 2 illustrates a schematic diagram of user equipment 200 provided by an implementation of the present disclosure. The user equipment 200 includes a transmitting module 210 and a receiving module 220.

The transmitting module 210 is used for transmitting data to a network device by using a first uplink transmission waveform on a first beam.

The receiving module 220 is used for receiving a first indication message transmitted by the network device, the first indication message is used for indicating an uplink transmission waveform corresponding to at least one beam.

The transmitting module 210 is further used for transmitting data to the network device by using a second uplink transmission waveform on a second beam of the at least one beam, the second uplink transmission waveform is an uplink transmission waveform corresponding to the second beam indicated in the first indication message.

In an implementation of the present disclosure, the indication message is transmitted by the network device to the UE to inform the UE to transmit data by using corresponding uplink transmission waveforms on different beams, such that the UE can transmit data on different beams through suitable uplink transmission waveforms, thus better uplink coverage and uplink transmission quality can be obtained, and the performance of uplink transmission is improved.

Optionally, as an implementation, the at least one beam includes two or more than two beams, and uplink transmission waveforms corresponding to different beams of the at least one beam are not exactly same.

Optionally, as an implementation, the uplink transmission waveform corresponding to the second beam is determined by the network device according to channel quality information of a transmission channel corresponding to the second beam or location information of the UE in a cell.

Optionally, as an implementation, the at least one beam does not include the first beam, and the transmitting module is further used for transmitting data to the network device by using the second uplink transmission waveform on the second beam when the first beam is blocked.

Optionally, as an implementation, the first indication message is further used for indicating that the at least one beam is a fallback beam of the UE.

Optionally, as an implementation, the receiving module 220 is further used for receiving a second indication message transmitted by the network device, the second indication message is used for indicating an uplink transmission waveform corresponding to the at least one beam, the uplink transmission waveform corresponding to the at least one beam indicated by the second indication message is different from the uplink transmission waveform corresponding to the at least one beam indicated by the first indication message; and the transmitting module is further used for transmitting data to the network device by using a third uplink transmission waveform on a third beam of the at least one beam, the third uplink transmission waveform is an uplink transmission waveform corresponding to the third beam indicated in the second indication message.

Optionally, as an implementation, the first indication message is high level signaling or Downlink Control Information (DCI).

Optionally, as an implementation, the uplink transmission waveform includes a waveform determined by using DFT-S-OFDM technology or a waveform determined by using CP-OFDM technology.

Specifically, the transmitting module 210 in an implementation of the present disclosure can be implemented by a transmitter or transmitter-related circuit, and the receiving module 220 can be implemented by a receiver or receiver-related circuit.

Figure 3:
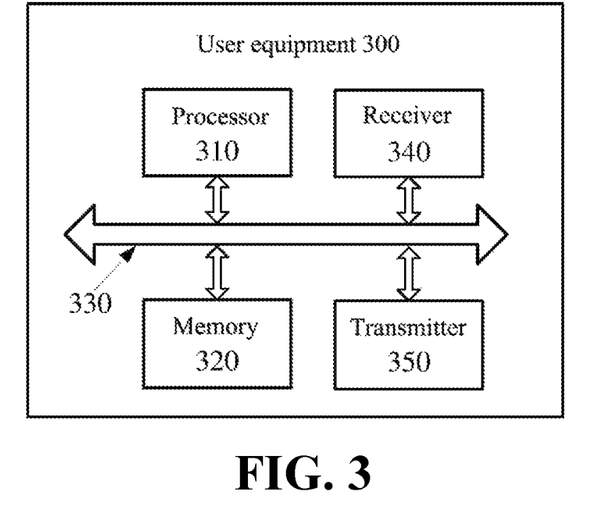
FIG. 3 illustrates another schematic diagram of user equipment provided by an implementation of the present disclosure.

As illustrated in FIG. 3, an implementation of the present disclosure further provides user equipment 300. The user equipment 300 includes a processor 310, a memory 320, a bus system 330, a receiver 340 and a transmitter 350, wherein the processor 310, the memory 320, the receiver 340 and the transmitter 350 are connected through the bus system 330. The memory 320 is used for storing instructions, and the processor 310 is used for executing the instructions stored in the memory 320 to control the receiver 340 to receive signals and to control the transmitter 350 to transmit signals. The transmitter 350 is used for transmitting data to a network device by using a first uplink transmission waveform on a first beam; the receiver 340 is used for receiving a first indication message transmitted by the network device, the first indication message is used for indicating an uplink transmission waveform corresponding to at least one beam; and the transmitter 350 is used for transmitting data to the network device by using a second uplink transmission waveform on a second beam of the at least one beam, the second uplink transmission waveform is an uplink transmission waveform corresponding to the second beam indicated in the first indication message.

In an implementation of the present disclosure, the indication message is transmitted by the network device to the UE to inform the UE to transmit data by using corresponding uplink transmission waveforms on different beams, such that the UE can transmit data on different beams through suitable uplink transmission waveforms, thus better uplink coverage and uplink transmission quality can be obtained, and the performance of uplink transmission is improved.

Optionally, as an implementation, the at least one beam includes two or more than two beams, and uplink transmission waveforms corresponding to different beams of the at least one beam are not exactly same.

Optionally, as an implementation, the uplink transmission waveform corresponding to the second beam is determined by the network device according to channel quality information of a transmission channel corresponding to the second beam or location information of the UE in a cell.

Optionally, as an implementation, the at least one beam does not include the first beam, and the transmitter 350 is specifically used for transmitting data to the network device by using the second uplink transmission waveform on the second beam when the first beam is blocked.

Optionally, as an implementation, the first indication message is further used for indicating that the at least one beam is a fallback beam of the UE.

Optionally, as an implementation, the receiver 340 is further used for receiving a second indication message transmitted by the network device, the second indication message is used for indicating an uplink transmission waveform corresponding to the at least one beam, the uplink transmission waveform corresponding to the at least one beam indicated by the second indication message is different from the uplink transmission waveform corresponding to the at least one beam indicated by the first indication message; and the transmitter 350 is further used for transmitting data to the network device by using a third uplink transmission waveform on a third beam of the at least one beam, the third uplink transmission waveform is an uplink transmission waveform corresponding to the third beam indicated in the second indication message.

Optionally, as an implementation, the first indication message is high level signaling or Downlink Control Information (DCI).

Optionally, as an implementation, the uplink transmission waveform includes a waveform determined by using Discrete Fourier Transform-Spread-Orthogonal Frequency Division Multiplexing (DFT-S-OFDM) technology or a waveform determined by using Cyclic Prefix-Orthogonal Frequency Division Multiplexing (CP-OFDM) technology.

It should be understood that the user equipment 200 illustrated in FIG. 2 or the user equipment 300 illustrated in FIG. 3 can be used for executing operations or processes related to the user equipment in the method implementation, and the operations and/or functions of various modules in the user equipment 200 or the user equipment 300 are respectively used for implementing the corresponding processes in the method implementation, which will not be repeated here for sake of conciseness.

Figure 4:
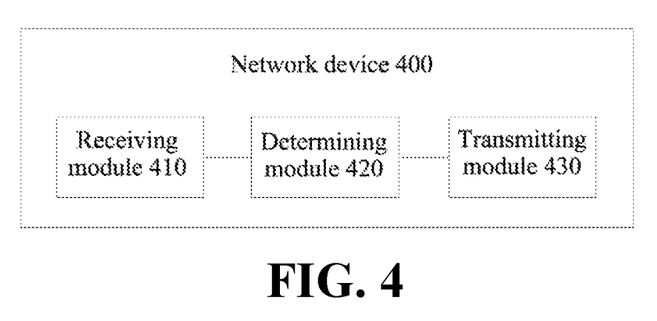
FIG. 4 illustrates a schematic diagram of a network device provided by an implementation of the present disclosure.

FIG. 4 illustrates a schematic diagram of a network device 400 provided by an implementation of the present disclosure. The network device 400 includes a receiving module 410, a determining module 420, and a transmitting module 430.

The receiving module 410 is used for receiving data transmitted by User Equipment (UE) by using a first uplink transmission waveform on a first beam.

The determining module 420 is used for determining an uplink transmission waveform corresponding to at least one beam.

The transmitting module 430 is used for transmitting a first indication message to the UE, the first indication message is used for indicating the uplink transmission waveform corresponding to the at least one beam.

In an implementation of the present disclosure, the indication message is transmitted by the network device to the UE to inform the UE to transmit data by using corresponding uplink transmission waveforms on different beams, such that the UE can transmit data on different beams through suitable uplink transmission waveforms, thus better uplink coverage and uplink transmission quality can be obtained, and the performance of uplink transmission is improved.

Optionally, as an implementation, the at least one beam includes two or more than two beams, and uplink transmission waveforms corresponding to different beams of the at least one beam are not exactly same.

Optionally, as an implementation, the determining module 420 is used for determining the uplink transmission waveform of each beam of the at least one beam according to at least one of the following information: channel quality information of a transmission channel corresponding to the each beam, and location information of the UE in a cell.

Optionally, as an implementation, at least one beam does not include the first beam, and the first indication message is further used for instructing the UE to use the at least one beam as a fallback beam.

Optionally, as an implementation, the determining module 420 is further used for re-determining an uplink transmission waveform corresponding to the at least one beam, the re-determined uplink transmission waveform corresponding to the at least one beam is different from an uplink transmission waveform corresponding to the at least one beam determined at a previous time; and the transmitting module 430 is further used for transmitting a second indication message to the UE, the second indication message is used for indicating the re-determined uplink transmission waveform corresponding to the at least one beam.

Optionally, as an implementation, the first indication message is high level signaling or Downlink Control Information (DCI).

Optionally, as an implementation, the uplink transmission waveform includes a waveform determined by using DFT-S-OFDM technology or a waveform determined by using CP-OFDM technology.

Specifically, the determining module 420 in an implementation of the present disclosure may be implemented by a processor or processor-related circuit. The receiving module 410 may be implemented by a receiver or receiver-related circuit. The transmitting module 430 may be implemented by a transmitter or transmitter-related circuit.

Figure 5:
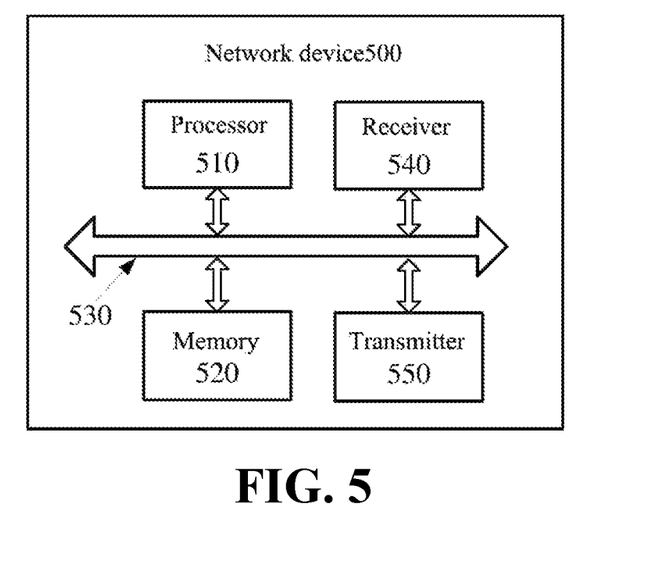
FIG. 5 illustrates another schematic diagram of a network device provided by an implementation of the present disclosure.

As illustrated in FIG. 5, the implementation of the present disclosure further provides a network device 500. The network device 500 includes a processor 510, a memory 520, a bus system 530, a receiver 540 and a transmitter 550, wherein the processor 510, the memory 520, the receiver 540 and the transmitter 550 are connected through the bus system 530. The memory 520 is used for storing instructions, and the processor 510 is used for executing the instructions stored in the memory 520 to control the receiver 540 to receive signals and to control the transmitter 550 to transmit signals. The receiver 540 is used for receiving data transmitted by User Equipment (UE) by using a first uplink transmission waveform on a first beam; the processor 510 is used for determining an uplink transmission waveform corresponding to at least one beam; and the transmitter 530 is used for transmitting a first indication message to the UE, the first indication message is used for indicating the uplink transmission waveform corresponding to the at least one beam.

In an implementation of the present disclosure, the indication message is transmitted by the network device to the UE to inform the UE to transmit data by using corresponding uplink transmission waveforms on different beams, such that the UE can transmit data on different beams through suitable uplink transmission waveforms, thus better uplink coverage and uplink transmission quality can be obtained, and the performance of uplink transmission is improved.

Optionally, as an implementation, the at least one beam includes two or more than two beams, and uplink transmission waveforms corresponding to different beams of the at least one beam are not exactly same.

Optionally, as an implementation, the processor 510 is specifically used for determining the uplink transmission waveform of each beam of the at least one beam according to at least one of the following information: channel quality information of a transmission channel corresponding to the each beam, and location information of the UE in a cell.

Optionally, as an implementation, the at least one beam does not include the first beam, and the first indication message is further used for instructing the UE to use the at least one beam as a fallback beam.

Optionally, as an implementation, the processor 510 is further used for re-determining an uplink transmission waveform corresponding to the at least one beam, the re-determined uplink transmission waveform corresponding to the at least one beam is different from an uplink transmission waveform corresponding to the at least one beam determined at a previous time; and the transmitter 430 is further used for transmitting a second indication message to the UE, the second indication message is used for indicating the re-determined uplink transmission waveform corresponding to the at least one beam.

Optionally, as an implementation, the first indication message is high level signaling or Downlink Control Information (DCI).

Optionally, as an implementation, the uplink transmission waveform includes a waveform determined by using DFT-S-OFDM technology or a waveform determined by using CP-OFDM technology.

It should be understood that the network device 400 illustrated in FIG. 4 or the network device 500 illustrated in FIG. 5 can be used for executing operations or processes related to the user equipment in the method implementation, and the operations and/or functions of various modules in the user equipment 400 or the user equipment 500 are respectively used for implementing the corresponding processes in the method implementation, which will not be repeated here for sake of conciseness.

It should be understood that a processor in an implementation of the present disclosure may be a central processing unit (CPU), or may be other general-purpose processor, Digital Signal Processor (DSP), Application Specific Integrated Circuit (ASIC), Field Programmable Gate Array (FPGA) or other programmable logic device, discrete gate or transistor logic device, discrete hardware component, etc. A general-purpose processor may be a microprocessor or any conventional processor.

It should also be understood that memory in an implementation of the present disclosure may be volatile memory or non-volatile memory, or may include both volatile and non-volatile memory. Herein, non-volatile memory may be Read-Only Memory (ROM), Programmable Read-Only Memory (PROM), Erasable PROM (EPROM), Electrically EPROM (EEPROM), or flash memory. Volatile memory may be Random Access Memory (RAM), which serve as external cache. Through exemplary description instead of restrictive description, many types of RAMs are available, such as Static RAM (SRAM), Dynamic RAM (DRAM), Synchronous DRAM (SDRAM), Double Data Rate SDRAM (DDRAM), Enhanced SDRAM (ESDRAM), Synchlink DRAM (SLDRAM) and Direct Rambus RAM (DRRAM).

It should be noted that, when a processor is a general-purpose processor, the DSP, ASIC, FPGA or other programmable logic devices, a discrete gate or a transistor logic device, a discrete hardware component, the memory (storage module) may be integrated into the processor.

It should also be understood that, in an implementation of the present disclosure, a bus system may include not only a data bus, but also a power bus, a control bus, a state signal bus, etc. For the sake of clear description, however, various buses are marked as the bus systems in FIG. 3 and FIG. 5.

In the process of implementation, acts of the above-mentioned method may be accomplished by integrated logic circuits of hardware in the processor or instructions in the form of software. The acts of the method disclosed in connection with the implementations of the present disclosure may be directly embodied in the execution of a hardware processor or in the execution in the combination of hardware and software modules in the processor. Software modules may be located in typical storage media in the art such as RAM, flash memory, read-only memory, programmable read-only memory, electrical erasable programmable memory, or registers. The storage medium is located in the memory. The processor reads the information in the memory and accomplishes the acts of the above-mentioned method with its hardware. To avoid repetition, no detailed description is made herein.

It should further be understood that various numerical reference signs involved herein are only used for ease of distinguishing in description, but not used for limiting the scope of the implementations of the present disclosure.

It should be understood that in various implementations of the present disclosure, values of sequence numbers in the above-mentioned process do not imply an order of execution, and an order of execution of each process should be determined by its function and internal logic, and should not constitute any limitation on an implementation process of the implementation of the present disclosure.

Those of ordinary skill in the art will recognize that the exemplary elements and algorithm acts described in connection with the implementations disclosed herein can be implemented in electronic hardware, or a combination of computer software and electronic hardware. Whether these functions are performed in hardware or software depends on the specific application and design constraints of the technical solution. Skilled artisans may use different methods to implement the described functions for each particular application, but such implementation should not be considered to be beyond the scope of the implementations of the present disclosure.

In several implementations provided by the present disclosure, it should be understood that the disclosed apparatus and method may be implemented in other ways. For example, the apparatus implementations described above are only illustrative, for example, the division of the modules is only a logical function division, and there may be other division manners in actual implementation. For example, multiple modules or components may be combined or integrated into another module, or some features may be ignored or not executed.

The module described as a separate module may or may not be physically separated, and the component shown as a module may or may not be a physical module, i.e., may be located in one place or may be distributed over multiple network units.

In addition, various functional modules in various implementations of the present disclosure may be integrated into one processing module, or may be physically present separately, or two or more modules may be integrated into one module.

The foregoing are merely exemplary implementations of the present disclosure. Any person skilled in the art may easily conceive changes or substitutions within the technical scope disclosed by the present disclosure, which should be included within the protection scope of the present disclosure. Therefore, the protection scope of the present disclosure should be subject to the protection scope of the claims.

We claim:

1. A method for data transmission, comprising:
   transmitting, by User Equipment (UE), data to a network device by using a first uplink transmission waveform, the first uplink transmission waveform being a waveform based on Cyclic Prefix-Orthogonal Frequency Division Multiplexing (CP-OFDM) technology, wherein the waveform based on CP-OFDM technology is a default/fallback uplink transmission waveform configured by the UE supporting both the CP-OFDM technology and a Discrete Fourier Transform-Spread-Orthogonal Frequency Division Multiplexing (DFT-S-OFDM) technology, the default/fallback uplink transmission waveform is configured by the UE according to system information broadcasted by the network device, and when a first indication message from the network device is not received, the UE uses the waveform based on the CP-OFDM technology as the default/fallback uplink transmission waveform for uplink transmission; and
   when the UE receives the first indication message transmitted by the network device, transmitting, by the UE, data to the network device by using a second uplink transmission waveform indicated by the first indication message, the second uplink transmission waveform being a waveform based on the DFT-S-OFDM technology;
   wherein uplink transmission waveforms of different uplink channels are configured independently, the uplink channels comprise a physical uplink shared channel (PUSCH) and physical uplink control channels (PUCCHs), the uplink transmission waveform of the PUSCH is configured to be the waveform based on the CP-OFDM technology, the PUCCHs are divided into N PUCCH groups according to formats of the PUCCHs, and the N PUCCH groups comprise at least one PUCCH group of which the uplink transmission waveform is configured to be the waveform based on the DFT-S-OFDM technology.

2. The method of claim 1, wherein
   the third uplink transmission waveform indicated by the second indication message is different from the second uplink transmission waveform indicated by the first indication message.

3. The method of claim 1, wherein the first indication message is high level signaling or Downlink Control Information (DCI).

4. The method of claim 1, wherein the method further comprises:
   receiving, by the UE, a second indication message transmitted by the network device, wherein the second indication message is used for indicating a third uplink transmission waveform; and
   transmitting, by the UE, data to the network device by using the third uplink transmission waveform indicated by the second indication message.

5. A method for data transmission, comprising:
   receiving, by a network device, data transmitted by User Equipment (UE) by using a first uplink transmission waveform, the first uplink transmission waveform being a waveform based on Cyclic Prefix-Orthogonal Frequency Division Multiplexing (CP-OFDM) technology, wherein the waveform based on CP-OFDM technology is a default/fallback uplink transmission waveform configured by the UE supporting both the CP-OFDM technology and a Discrete Fourier Transform-Spread-Orthogonal Frequency Division Multiplexing (DFT-S-OFDM) technology, the default/fallback uplink transmission waveform is configured by the UE according to system information broadcasted by the network device, and when a first indication message from the network device is not received, the UE uses the waveform based on CP-OFDM technology as the default/fallback uplink transmission waveform for uplink transmission; and
   transmitting, by the network device, the first indication message to the UE, the first indication message indicating a second uplink transmission waveform for use by the UE to send data to the network device, the second uplink transmission waveform being a waveform based on the DFT-S-OFDM technology;
   wherein uplink transmission waveforms of different uplink channels are configured independently, the uplink channels comprise a physical uplink shared channel (PUSCH) and physical uplink control channels (PUCCHs), the uplink transmission waveform of the PUSCH is configured to be the waveform based on the CP-OFDM technology, the PUCCHs are divided into N PUCCH groups according to formats of the PUCCHs, and the N PUCCH groups comprise at least one PUCCH group of which the uplink transmission waveform is configured to be the waveform based on the DFT-S-OFDM technology.

6. The method of claim 5, wherein the re-determined third uplink transmission waveform is different from an uplink transmission waveform determined at a previous time.

7. The method of claim 5, wherein the first indication message is high level signaling or Downlink Control Information (DCI).

8. The method of claim 5, wherein the method further comprises:
   re-determining, by the network device, a third uplink transmission waveform; and
   transmitting, by the network device, a second indication message to the UE, wherein the second indication message is used for indicating the re-determined third uplink transmission waveform.

9. A User Equipment (UE), comprising: a processor, a memory, a bus system, a receiver and a transmitter, wherein the processor, the memory, the receiver and the transmitter are connected through the bus system, the memory is used for storing instructions, and the processor is used for executing the instructions stored in the memory to control the receiver to receive signals and to control the transmitter to transmit signals, wherein the transmitter is used for transmitting data to a network device by using a first uplink transmission waveform, the first uplink transmission waveform being a waveform based on Cyclic Prefix-Orthogonal Frequency Division Multiplexing (CP-OFDM) technology, wherein the waveform based on CP-OFDM technology is a default/fallback uplink transmission waveform configured by the UE supporting both the CP-OFDM technology and a Discrete Fourier Transform-Spread-Orthogonal Frequency Division Multiplexing (DFT-S-OFDM) technology, the default/fallback uplink transmission waveform is configured by the UE according to system information broadcasted by the network device, and when a first indication message from the network device is not received, the UE uses the waveform based on CP-OFDM technology as the default/fallback uplink transmission waveform for uplink transmission;

wherein when the receiver receives the first indication message transmitted by the network device, the transmitter is further used for transmitting data to the network device by using a second uplink transmission waveform indicated by the first indication message, the second uplink transmission waveform being a waveform based on the DFT-S-OFDM technology; and wherein the transmitter is further used for transmitting data to the network device by using the third uplink transmission waveform indicated by the second indication message wherein uplink transmission waveforms of different uplink channels are configured independently, the uplink channels comprise a physical uplink shared channel (PUSCH) and physical uplink control channels (PUCCHs), the uplink transmission waveform of the PUSCH is configured to be the waveform based on the CP-OFDM technology, the PUCCHs are divided into N PUCCH groups according to formats of the PUCCHs, and the N PUCCH groups comprise at least one PUCCH group of which the uplink transmission waveform is configured to be the waveform based on the DFT-S-OFDM technology.

10. The UE of claim 9, wherein the third uplink transmission waveform indicated by the second indication message is different from the second uplink transmission waveform indicated by the first indication message.

11. The UE of claim 9, wherein the first indication message is high level signaling or Downlink Control Information (DCI).

12. The UE of claim 9, wherein the receiver is further used for receiving a second indication message transmitted by the network device, the second indication message is used for indicating a third uplink transmission waveform; and wherein the transmitter is further used for transmitting data to the network device by using the third uplink transmission waveform indicated by the second indication message.

13. A network device, comprising: a processor, a memory, a bus system, a receiver and a transmitter, wherein the processor, the memory, the receiver and the transmitter are connected through the bus system, the memory is used for storing instructions, and the processor is used for executing the instructions stored in the memory to control the receiver to receive signals and to control the transmitter to transmit signals;

wherein the receiver is used for receiving data transmitted by User Equipment (UE) by using a first uplink transmission waveform, the first uplink transmission waveform being a waveform based on Cyclic Prefix-Orthogonal Frequency Division Multiplexing (CP-OFDM) technology, wherein the waveform based on CP-OFDM technology is a default/fallback uplink transmission waveform configured by the UE supporting both the CP-OFDM technology and a Discrete Fourier Transform-Spread-Orthogonal Frequency Division Multiplexing (DFT-S-OFDM) technology, the default/fallback uplink transmission waveform is configured by the UE according to system information broadcasted by the network device, and when a first indication message from the network device is not received, the UE uses the waveform based on CP-OFDM technology as the default/fallback uplink transmission waveform for uplink transmission;

wherein the transmitter is used for transmitting the first indication message to the UE, the first indication message indicating a second uplink transmission waveform for use by the UE to send data to the network device, the second uplink transmission waveform being a waveform based on the DFT-S-OFDM technology; and wherein uplink transmission waveforms of different uplink channels are configured independently, the uplink channels comprise a physical uplink shared channel (PUSCH) and physical uplink control channels (PUCCHs), the uplink transmission waveform of the PUSCH is configured to be the waveform based on the CP-OFDM technology, the PUCCHs are divided into N PUCCH groups according to formats of the PUCCHs, and the N PUCCH groups comprise at least one PUCCH group of which the uplink transmission waveform is configured to be the waveform based on the DFT-S-OFDM technology.

14. The network device of claim 13, wherein the re-determined third uplink transmission waveform is different from an uplink transmission waveform determined at a previous time.

15. The network device of claim 13, wherein the first indication message is high level signaling or Downlink Control Information (DCI).

16. The network device of claim 13, wherein the processor is used for re-determining a third uplink transmission waveform; and wherein the transmitter is further used for transmitting a second indication message to the UE, the second indication message is used for indicating the re-determined third uplink transmission waveform.

* * * * *